UNITED STATES PATENT OFFICE.

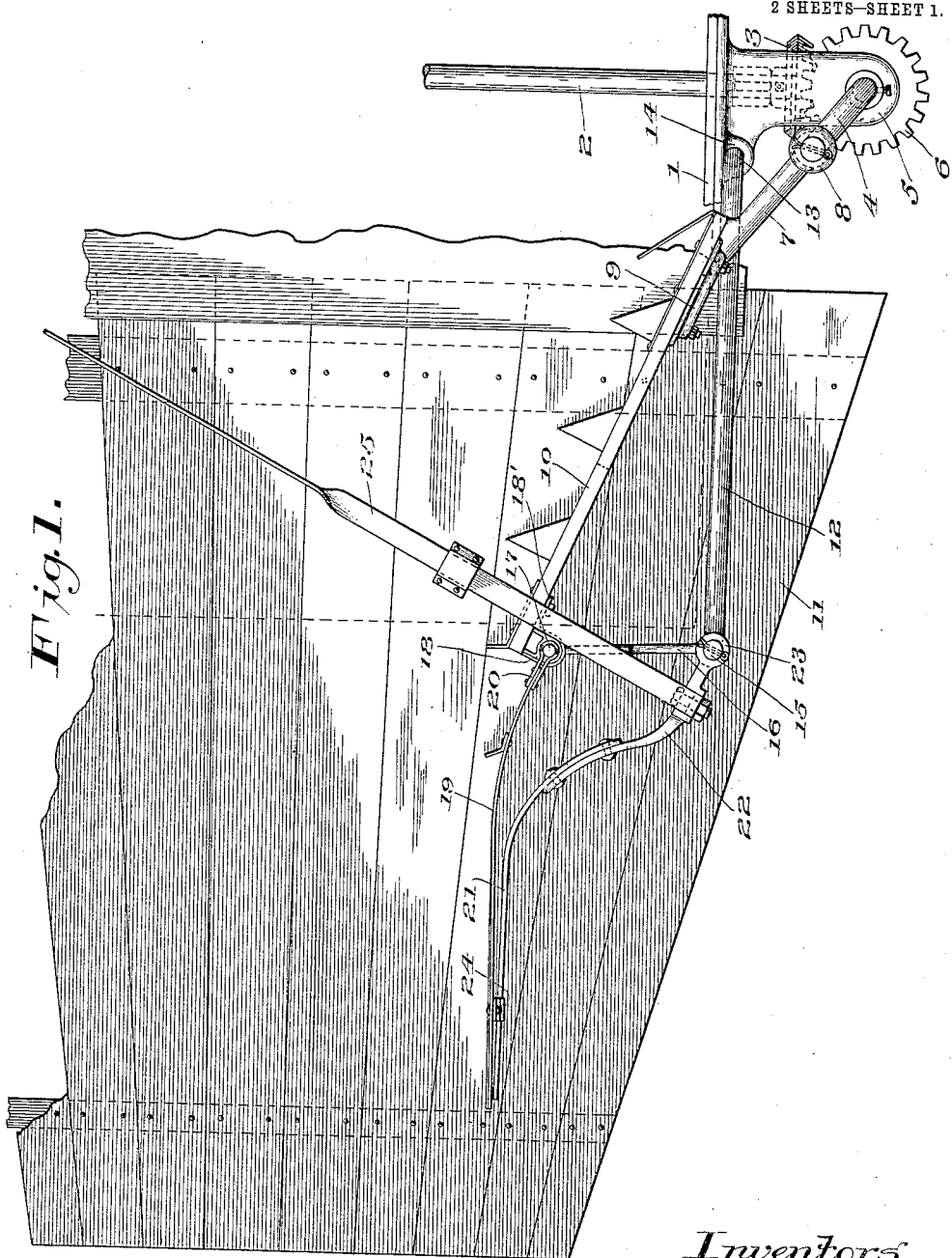

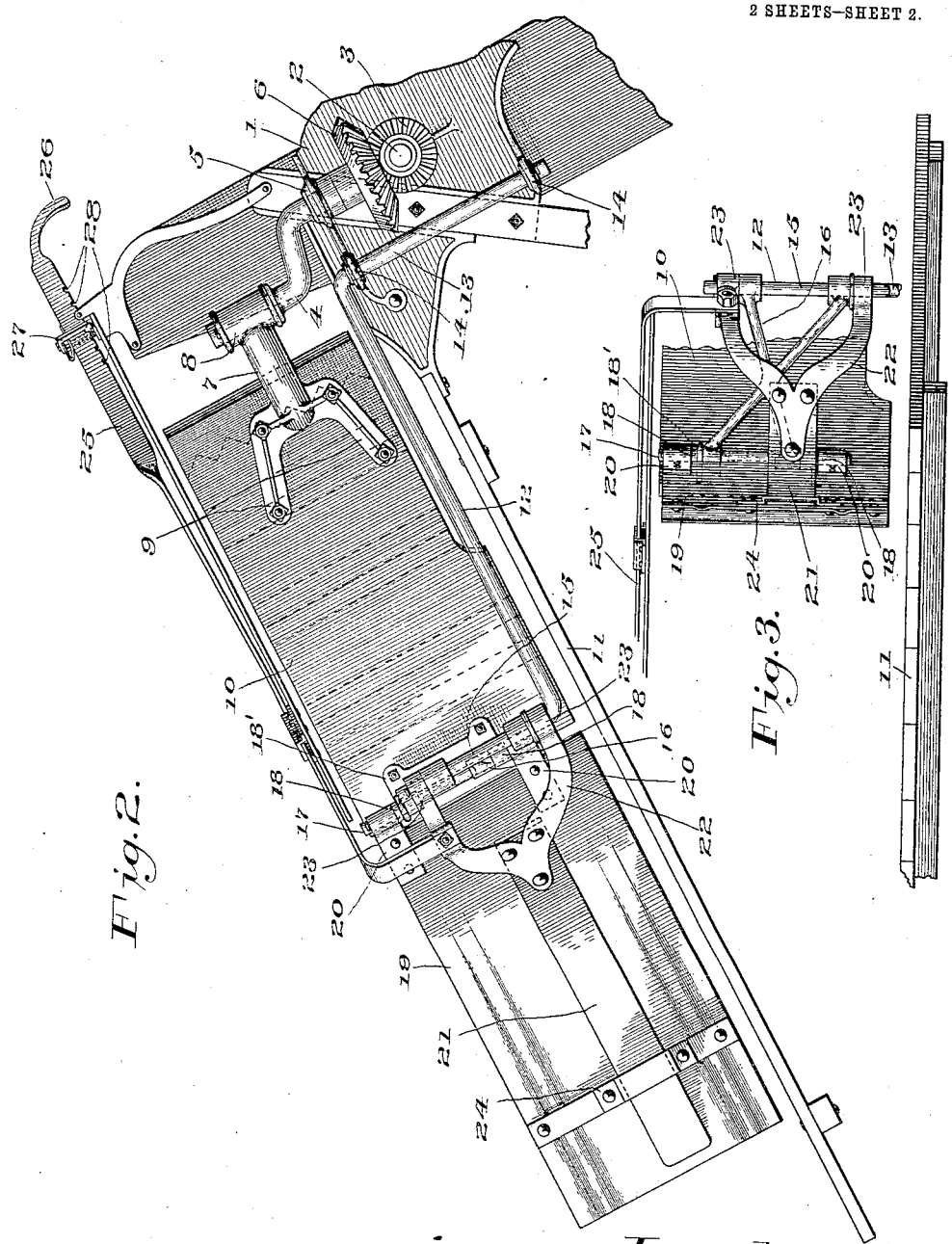

JOHN DANGEL, OF CHICAGO, AND BERT R. BENJAMIN, OF OAK PARK, ILLINOIS, ASSIGNORS TO INTERNATIONAL HARVESTER COMPANY, A CORPORATION OF NEW JERSEY.

BUTT-ADJUSTER FOR GRAIN-BINDERS.

1,041,968.     Specification of Letters Patent.     Patented Oct. 22, 1912.

Application filed March 28, 1912. Serial No. 686,748.

*To all whom it may concern:*

Be it known that we, JOHN DANGEL and BERT R. BENJAMIN, citizens of the United States, residing at Chicago and Oak Park, respectively, in the county of Cook and State of Illinois, have invented certain new and useful Improvements in Butt-Adjusters for Grain-Binders, of which the following is a specification.

Our invention relates to butt adjusters for grain binders and in particular to the manner of mounting the extension that commonly forms a part of the adjuster; the object of the invention being to provide a structure having few parts, that may be readily assembled, and one that will be efficient and durable in operation. These objects are attained by means of the mechanism illustrated by the accompanying drawings, in which—

Figure 1 represents a top plan view of part of the deck of a grain binding attachment for a harvester and part of the operative parts thereof, designed to illustrate the manner of driving the butt adjuster and of connecting our improved extension thereto; Fig. 2 is an end elevation of Fig. 1; and Fig. 3 is a detached detail of part of Fig. 2.

The same reference characters designate like parts throughout the several views.

1 represents the upper end of the front side of the grain elevator of a harvester; 2 the driving shaft of the upper roller of the lower elevator apron; 3 a bevel pinion secured to said shaft; 4 a butt adjuster actuating crank mounted in a bearing 5 supported by the elevator side and having a bevel pinion 6 secured to its lower end and meshing with pinion 3.

7 represents a bracket having a bearing portion 8 journaled upon the crank 4, and diverging arms 9, whereby the bracket is secured to a common form of butts forwarding board 10 that extends downward over the inclined deck 11 of the grain binding attachment and at right angles to the plane thereof.

12 represents a swinging butter supporting arm having a downwardly turned crank portion 13 at one end thereof that is received by openings in ear members 14 integral with the elevator member 1, in a manner permitting the arm to turn about the axis of the crank portion; the opposite end of the arm being provided with an upwardly turned crank portion 15, upon which is journaled the outside end of a bracket member 16, the opposite end of the bracket being pivotally connected, by means of a pin 17, to ear members 18, integral with the bracket member 18¹, that are secured to the lower end of the board 10.

19 represents an extension for the butter board that is provided with hinge members 20 whereby it is pivotally connected with the lower end of the butter board coaxially with the bracket member 16.

21 represents an arm having a forked member 22 secured to one end thereof, the forked member having bearing portions 23 whereby it is pivotally connected with the crank portion 15 of the arm 12; the opposite end of arm 21 being slidably received by a loop member 24 secured to the lower end of the butter extension.

25 represents an adjusting bar slidably mounted upon the frame structure of the machine, having one end thereof secured to the forked member 22 and the opposite end thereof provided with a handle portion 26; the bar adjacent the handle portion being received by a loop member 27, and provided with notches 28 spaced apart and adapted to engage with the loop in a manner to secure the adjusting bar in any desired position of adjustment.

In operation the upper end of the butter is given an orbital movement by means of the crank 4, and the lower end thereof and the extension swing upon the crank portion 15 of the arm 12, the lower end of the extension sliding upon its supporting arm 21, and by means of the adjusting bar 25 the butter may be adjusted in a manner to meet the varying conditions of grain.

What we claim as our invention, and desire to secure by Letters Patent, is:

1. A grain binding attachment for harvesters including, in combination, a grain elevator frame, an inclined deck leading downward and outward from the delivery end of said elevator frame, a butts adjuster including a board arranged at right angles to the plane of said deck and inclined downward and outward and having the upper and lower edges thereof substantially parallel therewith, means whereby an orbital movement is transmitted to the upper end of said board, a support for said board including a bar having a downwardly turned arm at one end thereof, said arm being journaled in bearings carried by said elevator frame, an upwardly turned arm at the opposite end of said bar, a swinging bracket member having one end thereof journaled upon said arm and the opposite end thereof pivotally connected with the opposite end of said board, an extension for said butts adjuster having one end thereof pivotally connected with said board, a support for said extension having one end thereof pivotally mounted upon the upturned arm of said adjuster support and the opposite end thereof slidably connected with the opposite end of said extension.

2. A grain binding attachment for harvesters including, in combination, a grain elevator frame, an inclined deck leading downward and outward from the delivery end of said elevator frame, a butts adjuster including a board arranged at right angles to the plane of said deck and inclined downward and outward and having the upper and lower edges thereof substantially parallel therewith, means whereby an orbital movement is transmitted to the upper end of said board, a support for said board including a bar having a downwardly turned arm at one end thereof, said arm being journaled in bearings carried by said elevator frame, an upwardly turned arm at the opposite end of said bar, a swinging bracket member having one end thereof journaled upon said arm and the opposite end thereof pivotally connected with the opposite end of said board, an extension for said butter having the upper and lower edges thereof arranged parallel with said deck and having one end thereof pivotally connected with the lower end of said board, a support for said extension including a bracket member having one end thereof pivotally mounted upon the upturned arm of said adjuster support, a bar having one end thereof secured to the opposite end of said bracket member, a loop secured to said extension and slidably receiving the opposite end of said bar, and an adjuster controlling member slidably mounted upon said elevator frame and having one end thereof connected with said bracket member.

JOHN DANGEL.
BERT R. BENJAMIN.

Witnesses:
E. L. BACON,
C. G. GIZEGORZEWSKI.

---

Copies of this patent may be obtained for five cents each, by addressing the "Commissioner of Patents, Washington, D. C."